United States Patent
Zhou et al.

(10) Patent No.: US 10,840,746 B2
(45) Date of Patent: Nov. 17, 2020

(54) METHODS AND APPARATUS FOR PERFORMING DEMODULATION USING MAXIMUM LIKELIHOOD SEQUENCE MATCHING IN A WIRELESS CHARGING DEVICE

(71) Applicant: Apple Inc., Cupertino, CA (US)

(72) Inventors: Bo Zhou, Santa Clara, CA (US); Atul A. Salvekar, Oakland, CA (US); Andrew H. Jones, Redwood City, CA (US); Brian D. Mariner, San Francisco, CA (US); Michael F. Jean, San Francisco, CA (US); Moshe H. Malkin, Menlo Park, CA (US); Benjamin M. Oztalay, San Francisco, CA (US); Arash Mehrabi, Cupertino, CA (US); Jose Santos Martinez, San Jose, CA (US)

(73) Assignee: Apple Inc., Cupertino, CA (US)

( * ) Notice: Subject to any disclaimer, the term of this patent is extended or adjusted under 35 U.S.C. 154(b) by 79 days.

(21) Appl. No.: 16/198,365

(22) Filed: Nov. 21, 2018

(65) Prior Publication Data
US 2019/0393734 A1    Dec. 26, 2019

Related U.S. Application Data

(60) Provisional application No. 62/687,443, filed on Jun. 20, 2018.

(51) Int. Cl.
*H02J 50/80* (2016.01)
*H04B 5/00* (2006.01)
(Continued)

(52) U.S. Cl.
CPC .............. *H02J 50/80* (2016.02); *H02J 7/025* (2013.01); *H02J 50/12* (2016.02); *H04B 5/0037* (2013.01)

(58) Field of Classification Search
CPC . H02J 50/80; H02J 50/12; H02J 7/025; H04B 5/0037
(Continued)

(56) References Cited

U.S. PATENT DOCUMENTS 7,554,508 B2 * 6/2009 Johnson ................... H03D 7/00
343/893
8,525,370 B2 9/2013 Walley et al.
(Continued)

*Primary Examiner* — Michael R. Fin
(74) *Attorney, Agent, or Firm* — Treyz Law Group, P.C.; Jason Tsai

(57) ABSTRACT

A wireless power transmitting device transmits wireless power signals to a wireless power receiving device using a wireless power transmitting coil. The wireless power receiving device may transmit data packets to the wireless power transmitting device. The wireless power transmitting device may include a data receiver that is coupled to the wireless power transmitting coil and that receives the transmitted data packets. The data receiver may be configured to demodulate the received data packets. The data packets may include at least preamble bits, start bits, and data bits encoded as biphase half-bit signals in accordance with a predefined wireless power transfer protocol. During demodulation, the receiver may perform preamble detection, start bit detection, and data bit detection by comparing the input signals to corresponding reference patterns using a maximum likelihood sequence detection scheme. Phase recovery may be employed throughout to help provide immunity to phase change.

15 Claims, 13 Drawing Sheets

(51) Int. Cl.
*H02J 7/02* (2016.01)
*H02J 50/12* (2016.01)

(58) Field of Classification Search
USPC .......................................................... 307/104
See application file for complete search history.

(56) References Cited

U.S. PATENT DOCUMENTS

| | | |
|---|---|---|
| 8,554,165 B2 | 10/2013 | Liu et al. |
| 8,874,031 B2 | 10/2014 | Kudo et al. |
| 9,583,964 B2 | 2/2017 | Murayama et al. |
| 9,997,929 B2 | 6/2018 | Yamamoto et al. |
| 10,141,770 B2 | 11/2018 | Partovi |
| 2014/0269886 A1* | 9/2014 | Plumb .................. H03M 5/145 375/232 |
| 2016/0087691 A1 | 3/2016 | Van Wageningen et al. |
| 2018/0331586 A1 | 11/2018 | Hao et al. |
| 2018/0337528 A1 | 11/2018 | Taya |
| 2019/0013698 A1 | 1/2019 | Shichino |

* cited by examiner 1 0   1 0   1 0 }750  (Initial Phase = 0°)

0 1   0 1   0 1 }752  (Initial Phase = 180°)

1 0   1 0   1 1 }760  (Initial Phase = 0°)
                    START 0 1   0 1   0 0 }762  (Initial Phase = 180°)
                    START

METHODS AND APPARATUS FOR PERFORMING DEMODULATION USING MAXIMUM LIKELIHOOD SEQUENCE MATCHING IN A WIRELESS CHARGING DEVICE

This application claims the benefit of provisional patent application No. 62/687,443, filed Jun. 20, 2018, which is hereby incorporated by reference herein in its entirety.

FIELD

This relates generally to wireless systems, and, more particularly, to systems in which devices are wirelessly charged.

BACKGROUND

In a wireless charging system, a wireless power transmitting device such as a device with a charging surface wirelessly transmits power to wireless power receiving device such as a portable electronic device. The portable electronic device receives the wirelessly transmitted power and uses this power to charge an internal battery or to power the device.

It may sometimes be desirable to transmit data from the wireless power receiving device to the wireless power transmitting device. So-called "in-band" communications schemes have been developed that allow wireless power receiving devices to communicate with wireless power transmitting devices. In a typical in-band communications scheme, a switching circuit that is coupled to a coil in the wireless power receiving device is used to modulate the load across the coil. The wireless power transmitting device will attempt to detect the modulated signal using a sensing circuit coupled to a coil in the wireless power transmitting device.

Sometimes, however, changing the load across the coil at the wireless power receiving device does not necessarily translate to a sufficiently detectable amplitude or phase change at the sensing circuit of the wireless power transmitting device.

SUMMARY

A wireless power transmitting device transmits wireless power signals to a wireless power receiving device. The wireless power transmitting device has an inverter that supplies signals to an output circuit that includes a wireless power transmitting coil. The inverter may modulate the signals at a given carrier frequency. The wireless power transmitting coil may be part of an array of wireless power transmitting coils that cover a wireless charging surface associated with the wireless power transmitting device.

The wireless power receiving device may transmit data signals to the wireless power transmitting device. The wireless power transmitting device may include a data receiver that is coupled to the wireless power transmitting coil and that receives the transmitted data signals. The data signals may be modulated at a data rate that is different than the carrier frequency (e.g., by dynamically adjusting the impedance at the wireless power receiving device at an arbitrary rate in relation to the carrier frequency). The data signals transmitted from the wireless power receiving device to the wireless power transmitting device may be modulated using the amplitude-shift keying (ASK) modulation scheme, as an example.

The data receiver may include a demodulator front end block configured to remove the impact of the carrier frequency from the received data signals, a down-sampling block configured to down-sample the received signals, a DC remover block configured to remove any DC bias from the down-sampled signals, a signal range normalizer block configured to scale the received data signals to a known dynamic range, and a low-pass filtering block for filtering out undesired high frequency components. In particular, the data receiver may demodulate the received signals at only the carrier frequency without processing any harmonic frequency components.

The data receiver may further include multiple detection blocks configured to detect protocol information in the received data during demodulation operations. In accordance with a given wireless power transfer standard, the received data signals may form one or more data packets each including at least preamble bits, start bits, data bits, and other control bits, which can be encoded as half-bits according to the Biphase Mark Code (BMC) encoding scheme (as an example). The detection blocks may include a preamble detection block for searching the encoded preamble bits, a start bit detection block for searching the encoded start bits (e.g., by comparing the received data signals to at least one start bit reference pattern using a maximum likelihood detection scheme), and a data bit detection block for searching the encoded data bits (e.g., by comparing the received data signals to data bit reference patterns dynamically generated based on a previously detected data bit).

The data receiver may also include an initial phase alignment block for performing phase alignment after detecting the preamble bits, a first phase adjustment block for performing first phase adjustments when detecting the start bits, and a second phase adjustment block for performing second phase adjustments when detecting the data bits. The data receiver may optionally include a protocol checking block, a checksum comparison block for ensuring that no data bits has been corrupted during transmission, and an ASK ending detection block for detecting when ASK transmission is over (e.g., by detecting abrupt changes in signal amplitude).

DETAILED DESCRIPTION

A wireless power system has a wireless power transmitting device that transmits power wirelessly to a wireless power receiving device. The wireless power transmitting device is a device such as a wireless charging mat, wireless charging puck, wireless charging stand, wireless charging table, or other wireless power transmitting equipment. The wireless power transmitting device has one or more coils that are used in transmitting wireless power to one or more wireless power receiving coils in the wireless power receiving device. The wireless power receiving device is a device such as a cellular telephone, watch, media player, tablet computer, pair of earbuds, remote control, laptop computer, other portable electronic device, or other wireless power receiving equipment.

During operation, the wireless power transmitting device supplies alternating-current signals to one or more wireless power transmitting coils. This causes the coils to transmit alternating-current electromagnetic signals (sometimes referred to as wireless power signals) to one or more corresponding coils in the wireless power receiving device. Rectifier circuitry in the wireless power receiving device converts received wireless power signals into direct-current (DC) power for powering the wireless power receiving device.

Figure 1:
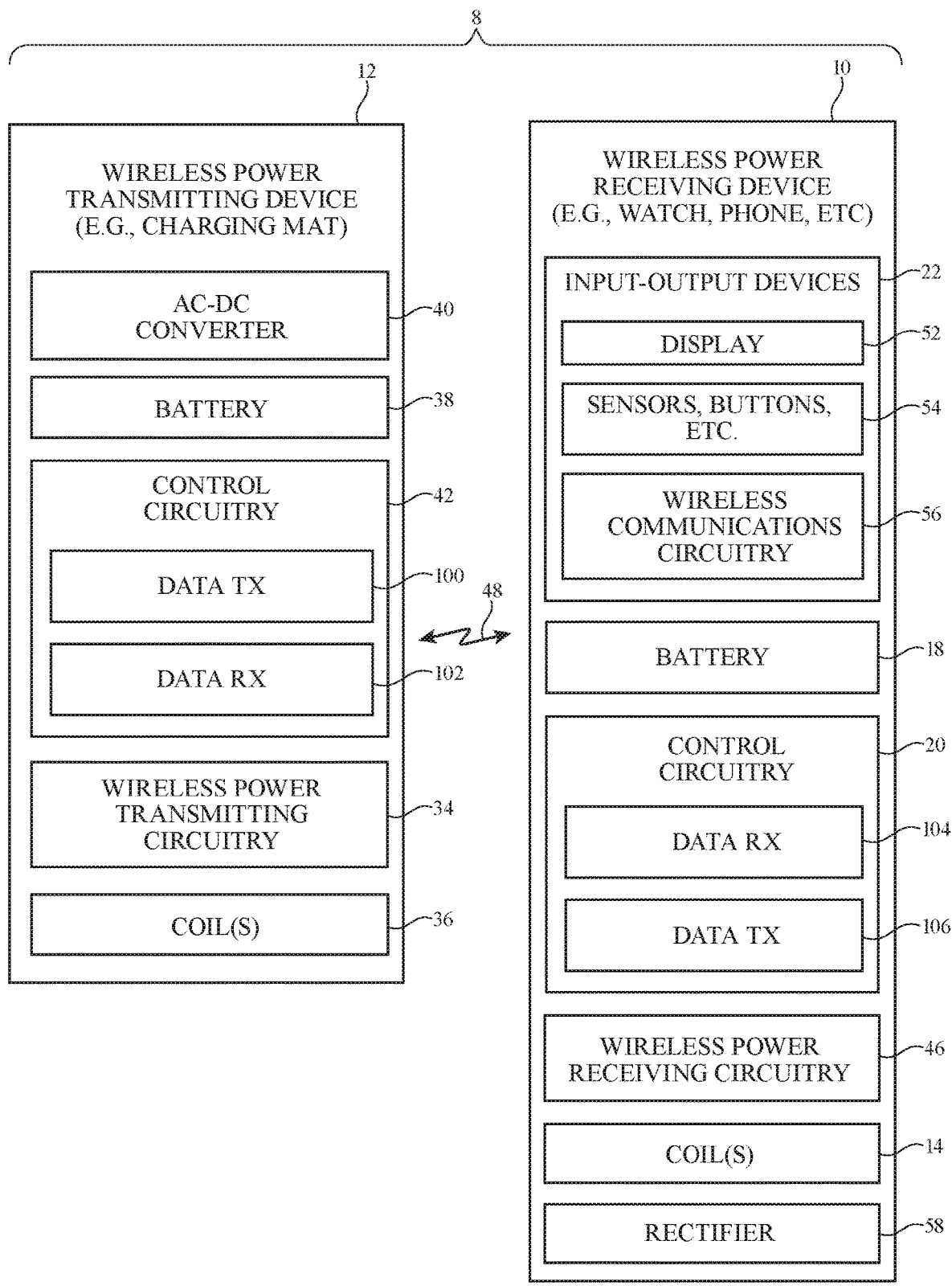
FIG. 1 is a schematic diagram of an illustrative wireless charging system in accordance with an embodiment.

An illustrative wireless power system (wireless charging system) is shown in FIG. 1. As shown in FIG. 1, wireless power system 8 includes wireless power transmitting device 12 and one or more wireless power receiving devices such as wireless power receiving device 10. Device 12 may be a stand-alone device such as a wireless charging mat, may be built into furniture, or may be other wireless charging equipment. Device 10 is a portable electronic device such as a wristwatch, a cellular telephone, a tablet computer, or other electronic equipment. Illustrative configurations in which device 12 is a mat or other equipment that forms a wireless charging surface and in which device 10 is a portable electronic device that rests on the wireless charging surface during wireless power transfer operations may sometimes be described herein as an example.

Devices 12 and 10 include control circuitry 42 and 20, respectively. Control circuitry 42 and 20 includes storage and processing circuitry such as microprocessors, power management units, baseband processors, digital signal processors, microcontrollers, and/or application-specific integrated circuits with processing circuits. Control circuitry 42 and 20 is configured to execute instructions for implementing desired control and communications features in system 8. For example, control circuitry 42 and/or 20 may be used in determining power transmission levels, processing sensor data, processing user input, processing other information such as information on wireless coupling efficiency from transmitting circuitry 34, processing information from receiving circuitry 46, using information from circuitry 34 and/or 46 such as signal measurements on output circuitry in circuitry 34 and other information from circuitry 34 and/or 46 to determine when to start and stop wireless charging operations, adjusting charging parameters such as charging frequencies, coil assignments in a multi-coil array, and wireless power transmission levels, and performing other control functions.

Control circuitry 42 and/or 20 may be configured to perform these operations using hardware (e.g., dedicated hardware or circuitry) and/or software (e.g., code that runs on the hardware of system 8). Software code for performing these operations is stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 42 and/or 20. The processing circuitry may include application-specific integrated circuits with processing circuitry, one or more microprocessors, or other processing circuitry.

During operation of system 8, a user places one or more devices 10 on the charging surface of device 12. Power transmitting device 12 is coupled to a source of alternating-current voltage such as an alternating-current power source (e.g., a wall outlet that supplies line power or other source of mains electricity), has a battery such as battery 38 for supplying power, and/or is coupled to another source of power. A power converter such as AC-DC power converter 40 can convert power from a main power source or other AC power source into DC power that is used to power control circuitry 42 and other circuitry in device 12. During operation, control circuitry 42 uses wireless power transmitting circuitry 34 and one or more coils 36 coupled to circuitry 34 to transmit alternating-current electromagnetic signals 48 to device 10 and thereby convey wireless power to wireless power receiving circuitry 46 of device 10.

Wireless power transmitting circuitry 34 has switching circuitry (e.g., transistors in an inverter circuit) that are turned on and off based on control signals provided by control circuitry 42 to create AC current signals through appropriate coils 36. As the AC currents pass through a coil 36 that is being driven by the inverter circuit, alternating-current electromagnetic fields (wireless power signals 48) are produced that are received by one or more corresponding coils 14 coupled to wireless power receiving circuitry 46 in receiving device 10. When the alternating-current electromagnetic fields are received by coil 14, corresponding alternating-current currents and voltages are induced in coil 14.

Rectifier circuit 58, which is sometimes considered to be part of circuitry 46, converts the received AC signals (e.g., received alternating-current currents and voltages associated with wireless power signals 48) from one or more coils 14 into DC voltage signals for powering device 10. The DC voltages are used in powering components in device 10 such as display 52, touch sensor components and other sensors 54 (e.g., accelerometers, force sensors, temperature sensors, light sensors, pressure sensors, gas sensors, moisture sensors, magnetic sensors, etc.), wireless communications circuitry 56 for communicating wirelessly with control circuitry 42 of device 12 and/or other equipment, audio components, and other components (e.g., input-output devices 22 and/or control circuitry 20) and are used in charging an internal battery in device 10 such as battery 18.

Device 12 and/or device 10 may communicate wirelessly. Devices 10 and 12 may, for example, have wireless transceiver circuitry in control circuitry 42 and 20 (and/or wireless communications circuitry such as circuitry 56) that allows wireless transmission of signals between devices 10 and 12 (e.g., using antennas that are separate from coils 36 and 14 to transmit and receive unidirectional or bidirectional wireless signals, using coils 36 and 14 to transmit and receive unidirectional or bidirectional wireless signals, etc.).

When it is desired to transmit data from device 12 to device 10, data transmitter circuitry 100 in control circuitry 42 may be used in modulating the signals that are supplied to coil 36. Control circuitry 20 of power receiving device 10 may use a data receiver circuit such as data receiver 104 to demodulate the modulated signal pulses from transmitter 100. Conversely, data transmitter circuit 106 of device 10 may be used in producing signals that are transmitted by coil 14 to coil 36 of device 12 and that are demodulated by data receiver 102 in control circuitry 42 of device 12.

When it is desired to transmit data from device 10 to device 12, device 12 may optionally cease transmission of power. While device 12 is not transmitting wireless power to device 24, data transmitter circuit 106 of device 10 may modulate one or more transistors in wireless power receiving circuitry 46 or control circuitry 20, thereby creating wireless signals that are transmitted from coil 14 to coil 36 of device 12. Because data signals are conveyed wirelessly from device 10 to device 12 using coils 14 and 36, this type of data communications between device 10 and device 12 may sometimes be referred to as "in-band" communications. Device 12 may use data receiver 102 to demodulate the wireless signals from device 10 and thereby receive the data transmitted from device 10. The transmitted data may be used to enable communication between device 10 to device 12, for example to supply feedback or other control signals to device 12, or may be used to convey other information. This example in which transmission of power is temporarily suspended during data transmission is merely illustrative. If desired, wireless power transmission and data reception may occur simultaneously (without ceasing the transmission of power).

When device 12 is in power transmission mode, control circuitry 42 may use pulse-width modulation (PWM) to modulate the AC drive signals that are being supplied to output inverter transistors coupled to coil 36 and thereby adjust how much power is being supplied to device 10. The duty cycle of the PWM pulse train may be adjusted dynamically to adjust the amount of power being wirelessly transmitted from device 12 to device 10. The duty cycle of the PWM pulses may, if desired, be adjusted based on power transmission feedback information that is conveyed in-band from data transmitter 106 to data receiver 102. For example, device 12 can use information that has been transmitted back from device 10 to device 12 to increase or decrease the amount of transmitted power that device 12 is providing to device 10.

The output inverter transistors in wireless power transmitting circuitry 34 are modulated to create an AC output waveform signal suitable for driving drive coil 36 for wireless power transfer. In some examples this signal has a frequency in the kilo-Hertz range, such as between 100 to 400 kHz, including frequencies particularly in the 125 to 130 kHz range. In some examples this signal is in the mega-Hertz range, such as about 6.78 MHz or more generally between 1 to 100 MHz. In some examples this signal is in the giga-Hertz range, such as about 60 GHz and more generally between 1 to 100 GHz. As this AC signal passes through coil 36, a corresponding wireless power signal (electromagnetic signal 48) is created and conveyed to coil 14 of device 10. This AC frequency at which power transmitting circuitry 34 is modulated is sometimes referred to as the power carrier frequency ("fc"). Data signals received at receiver 102 may be modulated at a lower frequency. For example, when transferring power in the 100 kHz range, data signals may be received at about 2 kHz (or other suitable frequency above or below 2 kHz).

Figure 2:
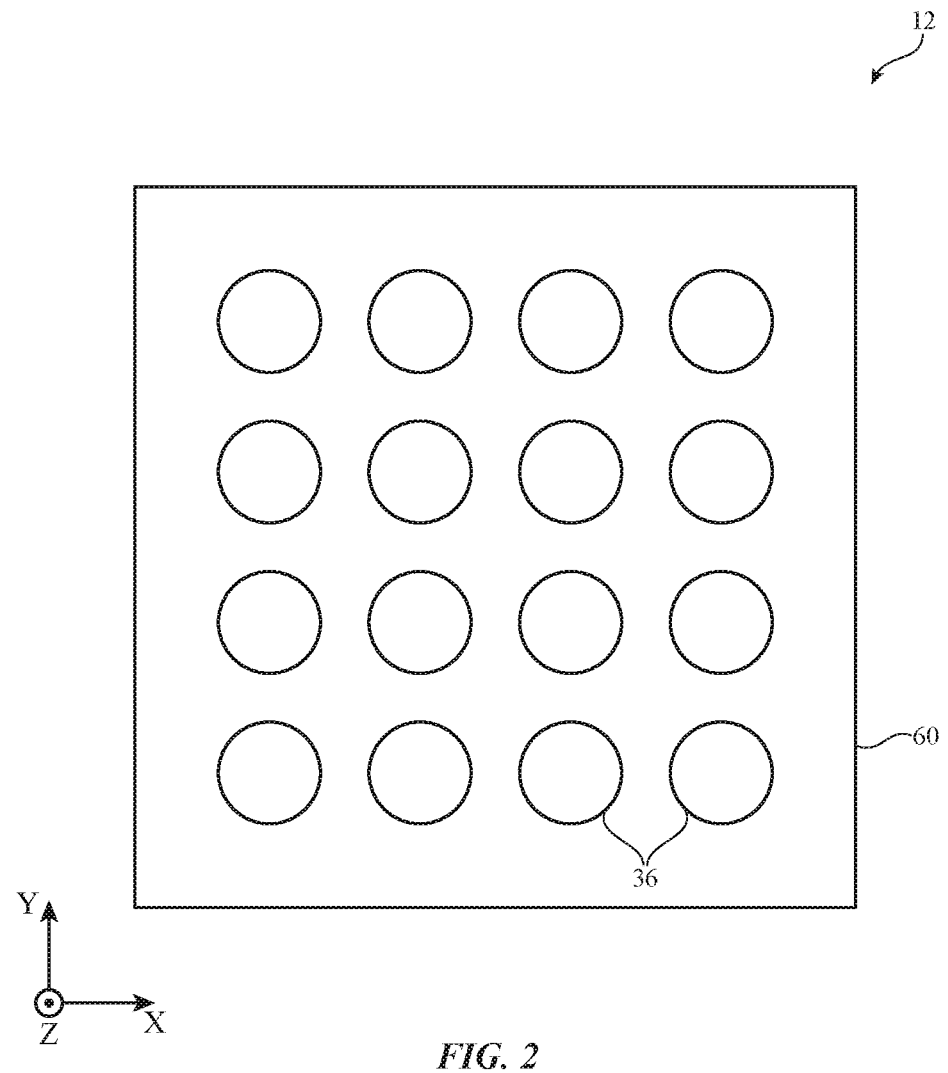
FIG. 2 is a top view of an illustrative wireless power transmitting device with an array of coils that forms a wireless charging surface in accordance with an embodiment.

With one illustrative configuration, wireless transmitting device 12 is a wireless charging mat or other wireless power transmitting equipment that has an array of coils 36 that supply wireless power over a wireless charging surface. This type of arrangement is shown in FIG. 2. In the example of FIG. 2, device 12 has an array of coils 36 that lie in the X-Y plane. Coils 36 of device 12 are covered by a planar dielectric structure such as a plastic member or other structure forming charging surface 60. The lateral dimensions (X and Y dimensions) of the array of coils 36 in device 12 may be 1-1000 cm, 5-50 cm, more than 5 cm, more than 20 cm, less than 200 cm, less than 75 cm, or other suitable size. Coils 36 may overlap or may be arranged in a non-overlapping configuration. Coils 36 can be placed in a rectangular array having rows and columns and/or may be tiled using a hexagonal tile pattern or other pattern.

During operation, a user may place one or more devices 10 on charging surface 60. Depending on the position and the orientation at which device 10 is placed on charging surface 60, the electric coupling between coils 36 and coil(s) 14 may be different. For example, device 10 may be placed on charging surface 60 such that coil 14 only overlaps with a first portion of coils 36. In another instance, device 10 may be placed on charging surface 60 such that coil 14 overlaps with a second portion of coils 36 that is different than the first portion. As a result, data transmission between devices 10 and 12 may be affected by the exact placement of device 10 on charging surface 60. In order for device 10 to properly authenticate device 10 to device 12 in a variety of scenarios, the in-band communications between devices 10 and 12 should be properly handled regardless of how portable device 10 is being placed on charging surface 60. In accordance with an embodiment, a data receiver circuit such as data receiver circuit 102 of the type shown in FIG. 3 is provided that is capable of handling data reception in all types of operating environments.

Figure 3:
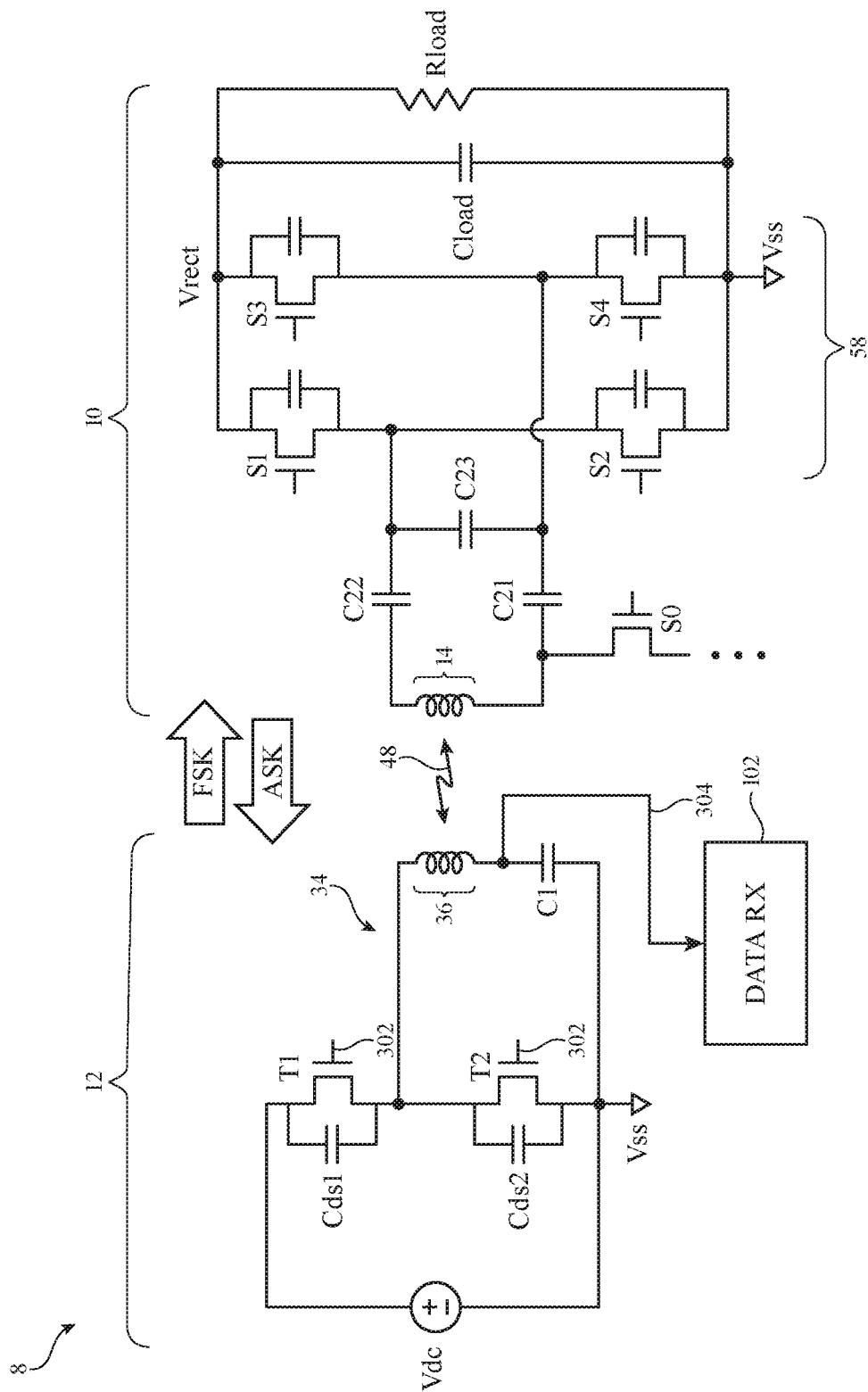
FIG. 3 is a circuit diagram of illustrative devices in a system of the type shown in FIG. 1 in accordance with an embodiment.

FIG. 3 is a circuit diagram showing illustrative circuitry that may be used for a wireless power transmitting device and wireless power receiving device in system 8. As shown in FIG. 3, wireless power transmitting device 12 may receive a DC voltage Vdc from AC-DC converter 40 (FIG. 1). Control circuitry 42 may produce control signals that are applied to gate terminals 302 of inverter transistors T1 and T2. Gates 302 of transistors T1 and T2 may receive complementary signals so that the gate of transistor T1 is high when the gate of transistor T2 is low, and vice versa. With one illustrative configuration, transistors T1 and T2 may be supplied with an AC signal at 200 kHz or other suitable frequency with a desired pulse width (or duty cycle) to control the amount of power being transmitted. Other suitable control signals may be applied to T1 and T2, if desired. Transistors T1 and T2 may be characterized by an internal diode and drain-source capacitance (see, e.g., capacitances Cds1 and Cds2), as shown schematically in FIG. 3.

Transistors T1 and T2 are coupled in series between a positive voltage terminal (at power supply voltage Vdc and a ground power supply terminal (at ground voltage Vss). Coil 36 has a first terminal coupled to a node between transistors T1 and T2 and a second terminal coupled to ground via capacitor C1. As the control signals are applied to gates 302 of output transistors T1 and T2, the DC voltage Vdc is converted into an AC current that passes through capacitor C1 and coil 36. This produces corresponding wireless signal 48, which is transmitted to device 10 and received by coil 14 in device 10. In general, coil 36 in FIG. 3 may represent one or more wireless power transmitting coils in device 12, optionally arranged in an array as shown in FIG. 2. Similarly, coil 14 in FIG. 3 may represent one or more wireless power receiving coils in device 10.

The received AC signal from coil 14 is conveyed through capacitors C21 and C22 to a bridge circuit of rectifier circuit 58. Capacitor C23 may be coupled between capacitors C21 and C22. Transistors S1-S4 of rectifier 58 may be operated in a synchronous rectifier mode to rectify the received signal and thereby produce rectified DC signal (voltage) Vrect across capacitor Cload and resistance Rload. In synchronous rectifier operation, control circuitry within wireless power receiving circuitry 46 senses the voltage at the drain of each transistor and uses the sense voltage as a trigger signal to actively turn on each transistor when appropriate. Synchronous rectifier operation may enhance rectification efficiency by eliminating power loss due to diode turn-on voltages. Capacitor Cload may store rectified voltage Vrect that is generated by the bridge circuit of rectifier 58 across the output load Rload. During normal operation, a charger (not shown) can use the DC voltage Vrect to charge battery 18 and to supply power to system circuitry in device 10 (see FIG. 1).

Data may be transmitted from device 12 to device 10. For example, the PWM signal that is applied to transistors T1 and T2 may be modulated by transmitter 100 using a modulation scheme such as frequency-shift keying (FSK) or other suitable modulation scheme. Data receiver 104 may have a detector circuit configured to detect the modulated data signal generated from transmitter 100. Data transmission from device 12 to device 10 may take place during power transmission from device 12 to device 10.

When it is desired to transmit data from device 10 to device 12, data transmitter 106 of control circuitry 20 may modulate at least transistor S0 in accordance with the data being transmitted. As described above, device 12 may optionally cease power transmission operations during the transmission of in-band data from device 10 to device 12. In the example of FIG. 3, transistor S0 may be coupled to the node between coil 14 and capacitor C21. Transistor S0 configured in this way may serve as an impedance adjustment switch and may be coupled to other passive impedance modifying circuitry (e.g., one or more inductors, capacitors, and/or resistors coupled in series, in parallel, and some combination of the two). The example of FIG. 3 in which switch S0 is coupled to the node between inductor 14 and capacitor C21 is merely illustrative. In general, switch S0 may be coupled to capacitor C22, to capacitor C23, or any other node of device 10 shown in FIG. 3.

When switch S0 is turned on (i.e., when transistor is activated to conduct current), the circuitry coupled to coil 14 may exhibit a first impedance. When switch S0 is turned off (i.e., when transistor S0 is deactivated to block current), the circuitry coupled to coil 14 may exhibit a second impedance that is different than the first impedance. Device 10 is therefore modulating data by changing the impedance at coil 14. Device 12 may be configured to decode the corresponding data by sensing the perturbation in the waveform based on the impedance changes. In general, any suitable modulation scheme may be used to support transmission of data from device 10 to device 12. With one illustrative configuration, transmitter 106 may modulate transmitted data using a modulation scheme such as amplitude-shift keying (ASK) modulation.

Switch S0, which is sometimes considered to be part of data transmitter circuit 106, may (for example) be modulated at an AC frequency of about 2 kHz (or other suitable frequency between 1 to 10 kHz). The frequency at which data being transmitted from device 10 to device 12 is modulated is sometimes referred to as the "data rate."

In contrast, the frequency at which inverter transistors T1 and T2 at device 12 are modulated may sometimes be referred to as the carrier frequency (fc), the power frequency, or the power carrier frequency. Output inverter transistors T1 and T2 in wireless power transmitting circuitry 34 may, for example, be modulated at a power carrier frequency of about 120 kHz (or other suitable frequency between 100 to 400 kHz) to create an AC signal to drive coil 36. As this AC signal passes through coil 36, a corresponding wireless power signal (electromagnetic signal 48) is created and conveyed to coil 14 of device 10. In general, the data rate is independent of the power carrier frequency (e.g., the carrier frequency can be adjusted while the data rate remains constant, or vice versa). Because the data signals are being transmitted in-band, the 2 kHz data signals may be modulated on top of the power carrier frequency.

In scenarios where the data signals transmitted from device 10 to device 12 are modulated using ASK modulation, data receiver 102 that receives the data signals from coil 36 via receiving path 304 may need to perform ASK demodulation to remove the carrier frequency. Conventionally, the ASK demodulation at the data receiver includes two stages: (1) an envelope detection stage and (2) a bit-generation stage. These two stages can be implemented based on an analog approach or a digital approach. The envelope detection stage involves extracting the envelope of the incoming signal to remove the carrier impact, which can be accomplished though envelope detection, rectification, and low-pass filtering. The extracted signal should resemble the original signal prior to amplitude modulation.

The output from the envelope detection stage is typically a continuous signal (i.e., for the analog implementation) or an over-sampled digital signal (i.e., for the digital implementation). The bit-generation stage involves processing the signals output from the envelope detection stage and producing the final binary representation of the incoming signal. This process often involves a thresholding mechanism to differentiate between a 0 and 1 based on the pulse width of the output signals. Typically, the demodulation is first performed to discern the raw bits, which is then followed by a separate protocol integrity checking. These conventional approaches might be satisfactory when the signal-to-noise ratio (SNR) is high. However, when significant noise or distortion is present, as is often the case during wireless charging, communications failure will occur.

In accordance with an embodiment, data receiver 102 is configured to embed protocol encoding knowledge into the demodulation process and to leverage the protocol encoding knowledge for maximum-likelihood sequence detection (e.g., by matching demodulated signals to expected reference signal patterns). Operating receiver 102 by detecting protocol information during demodulation can greatly improve the receiver's ability to reject noise and handle waveform distortion.

Figure 4A:
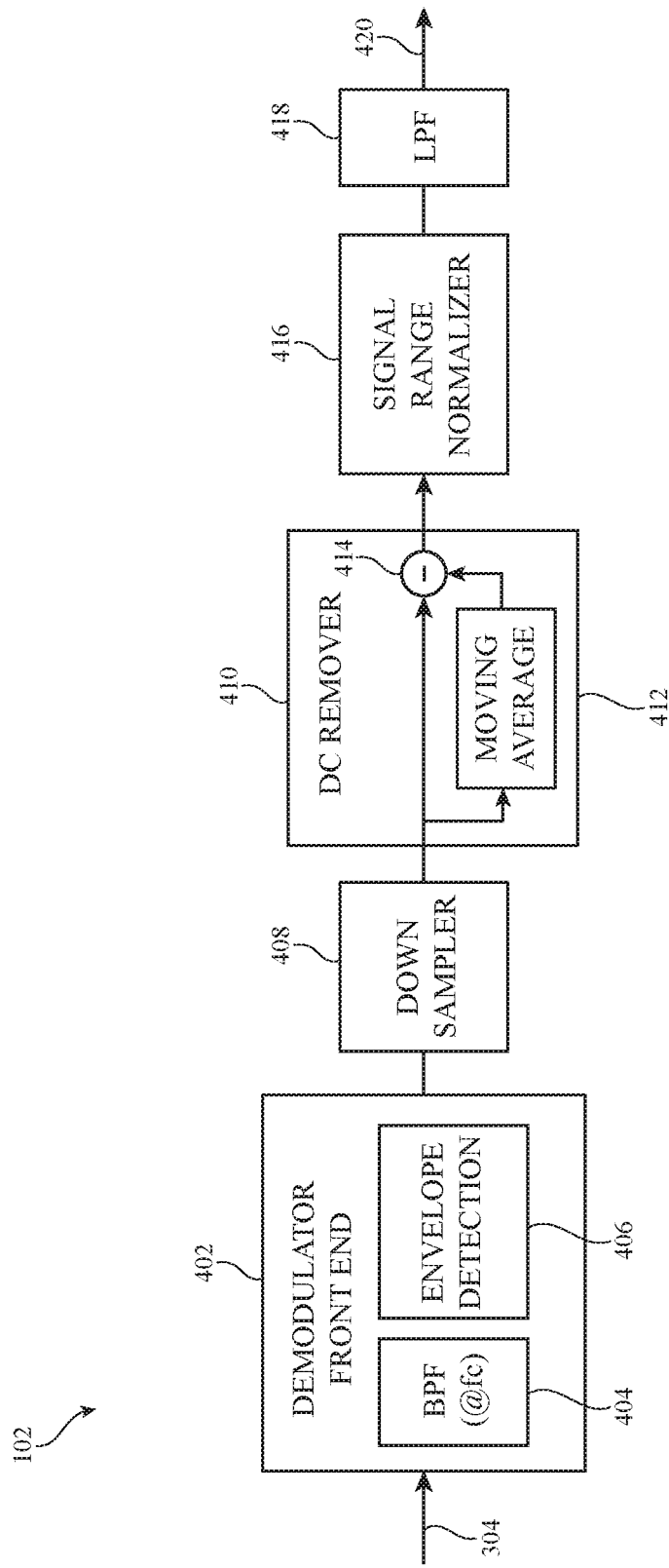
FIG. 4A is a circuit diagram of a first portion of an illustrative data receiver within a wireless power transmitting device in accordance with an embodiment.

FIG. 4A is a circuit diagram of a first portion of data receiver 102. As shown in FIG. 4A, data receiver 102 may include at least a demodulator front end block 402, a down-sampling block 408, a direct current (DC) remover block 410, a signal range normalizer block 416, and a low-pass filter block 418. The operation of blocks 402, 408, 410, 416, and 418 may be performed using hardware (e.g., dedicated hardware or circuitry on device 12) and/or software (e.g., code that runs on the hardware of device 12). Moreover, the hardware used to perform the various functions of these blocks can be implemented in the digital domain and/or in the analog domain.

Demodulator front end block 402 may be configured to receive ASK modulated signals from coil(s) 36 via receiver path 304. In particular, demodulator front end 402 may include a bandpass filter sub-block 404 and an envelope detection sub-block 406. As described above, signals 48 that are conveyed between devices 10 and 12 may be modulated at an AC frequency (sometimes referred to herein as the carrier frequency fc) of at least 100 kHz at wireless power transmitter circuitry 34. Bandpass filter sub-block 404 may be configured to perform bandpass filtering at the carrier frequency fc to help remove irrelevant signal components at all other frequencies. Envelope detection sub-block 406 may be configured to extract the envelope of the bandpass-filtered signal to remove the carrier frequency component and to generate corresponding front end output signals. The front end output signals generated in this way no longer has any impact from the carrier frequency and are sometimes referred to as "baseband" signals. These baseband signals may, as an example, be modulated at a data rate of 2 kbps (kilo bits per second).

The example of FIG. 4A in which demodulator font end 402 is implemented using bandpass filtering and envelope detection is merely illustrative. As another example, demodulator front end 402 may be implemented using an infinite impulse response (IIR) filter and a Goertzel algorithm, which extracts in-phase (I) and quadrature (Q) signal components from incoming signals received at input path 304.

In scenarios where demodulator front end 402 is configured using a digital implementation, the baseband signals generated at the output of front end 402 may be oversampled digital baseband signals with a sampling rate of 1.5 Msps (mega samples per second), 1-10 Msps, greater than 100 ksps (kilo samples per second), or other suitable oversampling frequencies. Down-sampling block 408 may be configured to down-sample the oversampled baseband signals, such as by decreasing the sampling rate from 1.5 Msps to a reduced sampling rate of 32 ksps, 1-100 ksps, or other suitable reduced frequency rate.

DC remover component 410 may receive the down-sampled signals from block 408 and may include a moving average sub-block 412 configured to compute a moving average value of the received down-sampled signals and a subtraction sub-block 414 configured to subtract the computed moving average value from the received down-sampled signals. DC remover 410 may also be implemented as a high-pass filter (in an analog approach). Operated in this way, DC remover 410 may remove any DC bias from the down-sampled signals (e.g., so that the resulting signal is balanced around zero volts) and can also help remove any undesired load transient effects. Thus, even if the amplitude of the incoming signal is slowly drift away from its nominal level, the receiver is still capable of properly recovering the original signal.

Signal range normalizer component 416 may receive signals from DC remover 410. Normalizer 416 may be configured to scale the receive signals to a known dynamic range based on local history information recently gathered by normalizer 416. The corresponding normalized signal may then be passed through low-pass filter component 418, which removes all unwanted higher order frequency components. The low-pass-filtered signals are provided on output path 420.

Figure 4B:
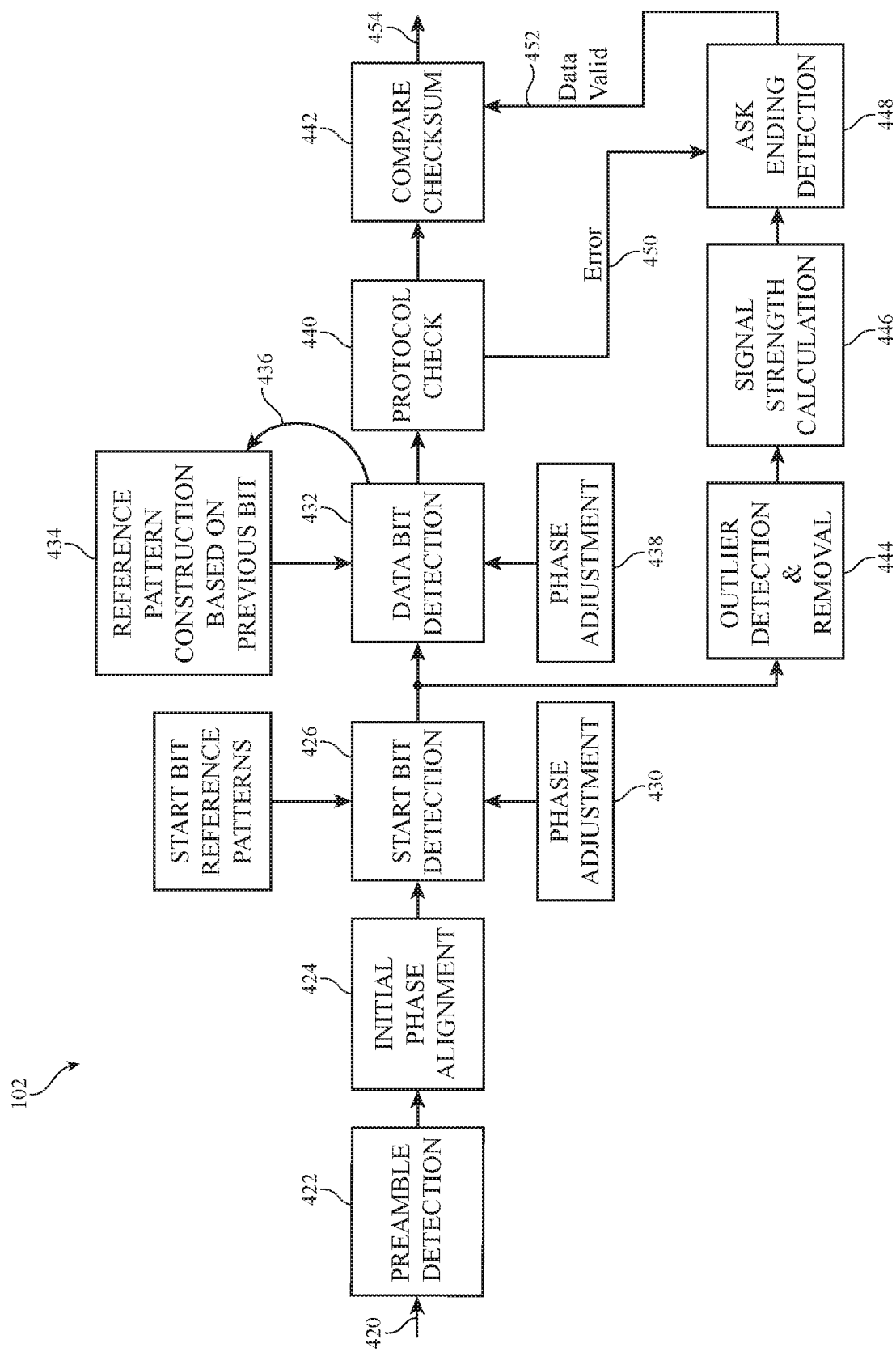
FIG. 4B is a circuit diagram of a second portion of an illustrative data receiver within a wireless power transmitting device in accordance with an embodiment.

FIG. 4B is a circuit diagram of a second portion of data receiver 102, which receives signals directly from low-pass filter component 418 via output path 420 (continuing from FIG. 4A). As shown in FIG. 4B, data receiver 102 may further include a preamble detection block 422, an initial phase alignment block 424, a start bit detection block 426 and associated phase adjustment block 430, a data bit detection block 432 and associated phase adjustment block 438, a protocol check block 440, a checksum comparison block 442, and other control circuitry such as outlier detection and removal block 444, signal strength calculation block 446, and ASK ending detection block 448. The operation of blocks 422, 424, 426, 432, 440, 442, 444, 446, and 448 may be performed using hardware (e.g., dedicated hardware or circuitry on device 12) and/or software (e.g., code that runs on the hardware of device 12). Moreover, the hardware used to perform the various functions of these blocks can be implemented in the digital domain and/or in the analog domain.

Figure 5:
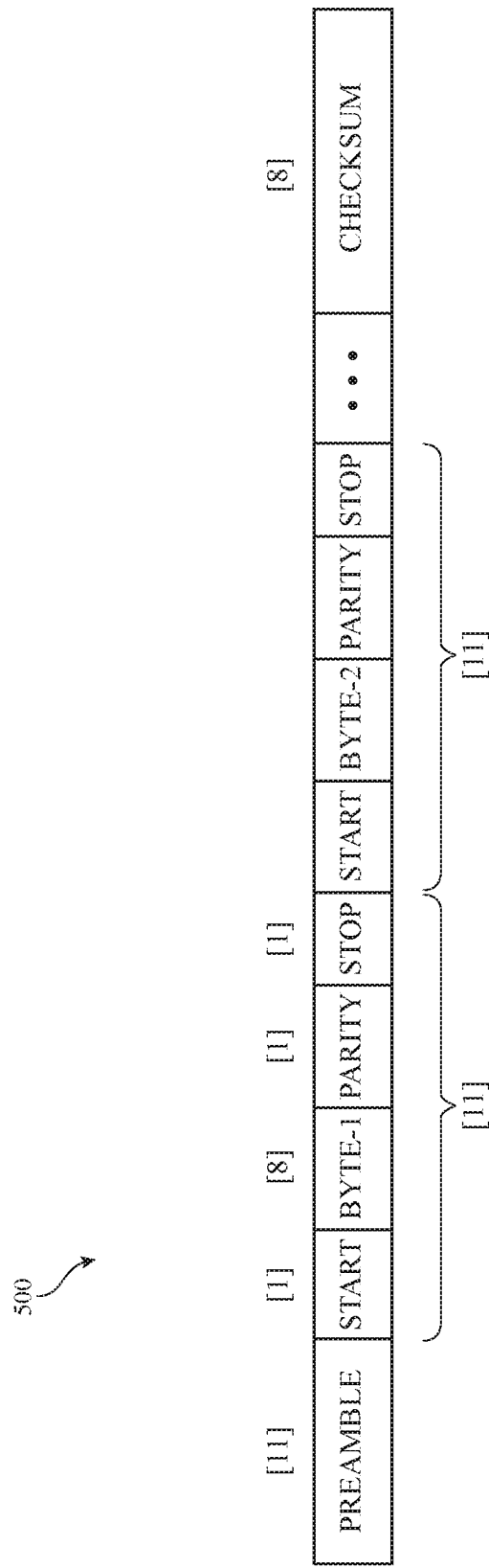
FIG. 5 is a diagram of an illustrative protocol-compliant data packet in accordance with an embodiment.

At least blocks 422, 426, and 432 shown in FIG. 4B are configured to detect protocol information in the received signals during the demodulation process (i.e., these blocks may be considered as part of demodulation circuitry within receiver 102). Depending on the wireless power transfer protocol that is implemented, the received signals may be ASK data packets with a particular packet structure/format. FIG. 5 is a diagram that illustrates the data packet format in accordance with the Qi wireless power transfer protocol developed by the Wireless Power Consortium. As shown in FIG. 5, the Qi-compliant data packet 500 includes a series of preamble bits followed by a message that may include up to 27 bytes. Each message byte (sometimes also referred to as a packet byte) is preceded by a start bit and is terminated by a parity bit and a stop bit (see, e.g., the start, parity, and stop bits accompanying each of the first message byte BYTE-1 and the second message byte BYTE-2). A precomputed checksum byte may follow the message/packet bytes at the end of data packet 500. The example of FIG. 5 where data packet 500 includes 11 preamble bits is merely illustrative. The Qi protocol may allow data packet 500 to include more than 11 preamble bits, if desired.

Figure 6:
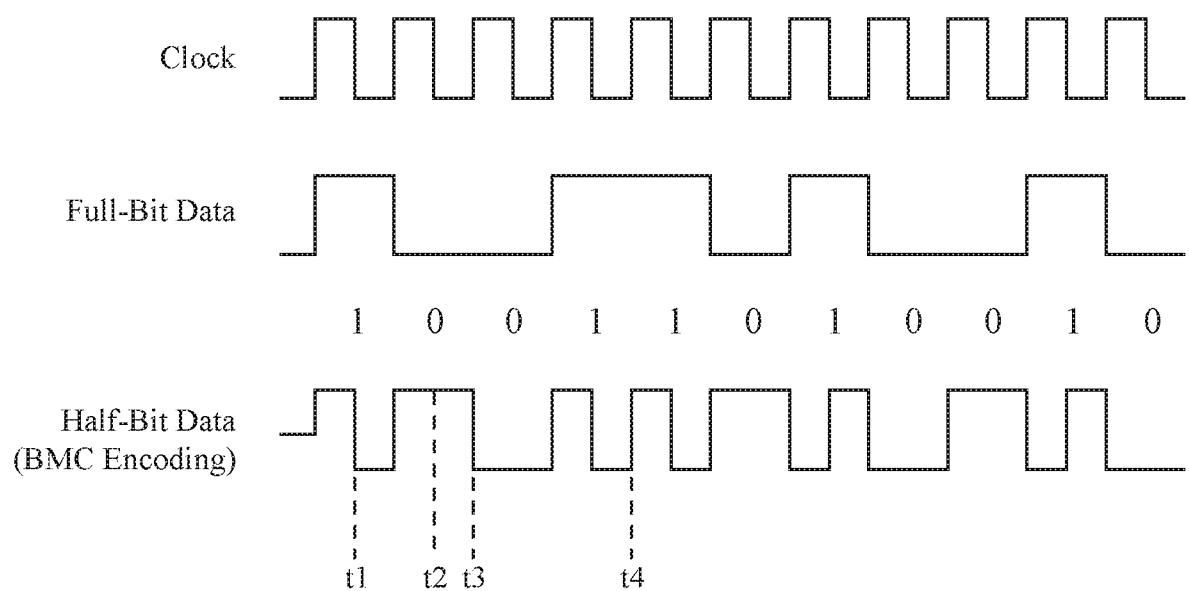
FIG. 6 is a diagram illustrating a Biphase Mark Code (BMC) encoding scheme in accordance with an embodiment.

The Qi protocol encodes data bits using a bi-phase encoding scheme such as the Biphase Mark Code (BMC)

encoding scheme. FIG. 6 is a diagram illustrating the BMC encoding scheme. The full-bit data stream is fairly straightforward—a logic "1" data bit corresponds to a high full-bit signal, whereas a logic "0" data bit corresponds to a low full-bit signal. In contrast to the full-bit data stream, the BMC encoded data stream (sometimes referred to as the "half-bit" data stream) will toggle its signal value between every successive data bit whether or not the value of the data bit actually changes. For example, the half-bit data stream toggles at time t4 between two successive logic "0s" and also toggles at time t5 between two successive logic "1s." Guaranteeing a transition at least once every clock cycle helps provide for more robust clock recovery.

Within each clock cycle, the presence or absence of a transition is used to indicate the logical value of the data bit. In the example of FIG. 6, the presence of a transition at time t1 is used to indicate a logic "1" data bit value in that time slot, whereas the absence of a transition at time t2 is used to indicate a logic "0" data bit value in that time slot. Thus, it is not necessary to monitor the actual polarity of the sent signal since the value of the signal is not represented by absolute signal voltage levels but rather by their transitions. This version in which the half-bit stream exhibits a transition for a logic "1" and does not transition for a logic "0" is merely illustrative. In accordance with another suitable embodiment, the half-bit stream makes a transition for a logic "0" and does not transition for a logic "1." The BMC encoding version of FIG. 6 where the presence of a transition is used to encode a logic "1" and the absence of a transition is used to encode a logic "0" will be used as the representative encoding scheme for the purposes of describing the remaining embodiments.

Figures 7A, 7B, 7C:
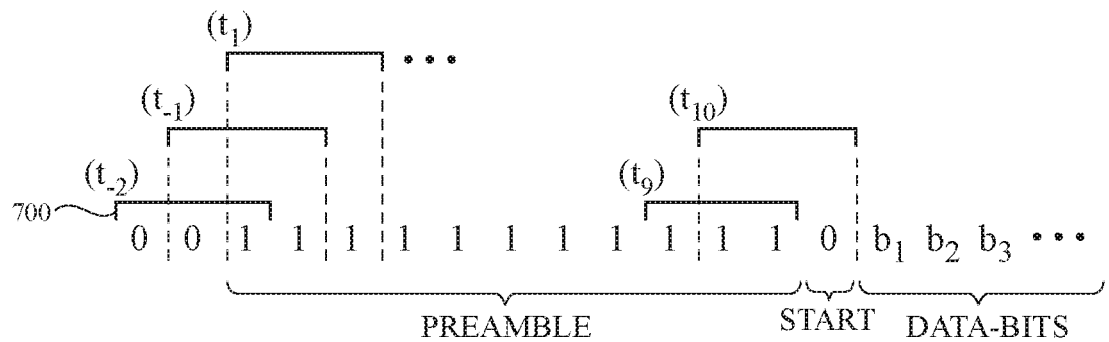
FIG. 7A is a diagram showing illustrative bit values in a data packet in accordance with an embodiment.
FIG. 7B is a diagram showing two different preamble reference patterns to search for during a preamble detection phase in accordance with an embodiment.
FIG. 7C is a diagram showing two different start bit reference patterns to search for during a start bit detection phase in accordance with an embodiment.

Referring back to FIG. 4B, preamble detection block 422 may receive data packet signals via path 420 and may be configured to identify preamble bits. FIG. 7A is a diagram showing a full-bit representation of an incoming data packet in accordance with an embodiment. Even though a full-bit representation is shown in FIG. 7A, the data bits are actually encoded as half-bits (e.g., using the BMC encoding scheme illustrated in FIG. 6). As shown in FIG. 7A, the preamble bits may all be logic ones.

In one suitable arrangement, preamble detection 422 may search for a series of logic ones using a sliding window 700 that is three bits wide. In other words, preamble detection 422 succeeds only when all the bits within window 700 are logic ones. At time $t_2$, block 422 may analyze the three most recently received data bits in window 700 (i.e., "001"). Since there are two zeros within window 700, the preamble has not been detected. During the next clock cycle at time $t_1$, the next series of bits appearing within window 700 includes one zero (i.e., "011"), so no preamble has been detected. During the following clock cycle at time $t_1$, the next series of bits appearing within window 700 now includes all ones (i.e., "111"). When all the bits within window 700 are logic ones, the leading edge of the preamble bits has been detected. After detecting the preamble bits, the edges of the data bit boundaries can be accurately aligned to edges of a local reference pattern. Preamble detection 422 may terminate after the first edge alignment operation.

Since the received data packet actually includes half-bit signals, preamble detection 422 using a window size of three bits may search for a preamble pattern such as preamble pattern 750 (FIG. 7B). A half-bit preamble pattern of "10-10-10" is equivalent to "111" in full-bit representation with an initial phase of 0 degrees. The preamble data bits, however, do not necessarily need to have an initial phase of 0 degrees. It is possible for the preamble data bits to exhibit an initial phase of 180 degrees. In that scenario, the resulting half-bit preamble pattern 752 will be "01-01-01" (see FIG. 7B), which also encodes to "111" in full-bit representation. Initial phase alignment block 424 may be configured to determine whether the initial phase of the detected preamble bits is 0 or 180 degrees and then to perform the necessary phase alignment operations (i.e., to determine the "polarity" of the incoming bits).

After initial phase alignment 424, the start bit detection component 426 may search for a message start bit again using sliding window 700. The start bit for a message byte may be the first logic "0" that follows the high preamble bits (e.g., the series of eleven or more logic high bits). In other words, start bit detection 426 succeeds only when the bits within window 700 are "110" (with the "0" being the start bit). At time $t_9$, block 426 may analyze the three most recently received data bits in window 700 (i.e., "111"). Since all the bits within window 700 are still all high preamble bits, the start bit has not been detected. During the next clock cycle at time $t_{10}$, the next series of bits appearing within window 700 includes one logic "0" (i.e., "110"). Identification of the first logic "0" following preamble detection is indicative of a successful start bit detection.

Since the received data packet actually includes half-bit signals, start bit detection 426 using a window size of three bits may search for one of two possible start bit reference patterns 760 and 762 (see, e.g., FIG. 7C). If the initial phase of the incoming bits has been determined to be 0 degrees, then start bit detection 426 may compare the bits in window 700 to start bit reference pattern 760 (e.g., "10-10-11," which is equivalent to "110" in full-bit representation and where the "11" half-bits represent to detected start bit). If the initial phase of the incoming bits has been determined to be 180 degrees, then start bit detection 426 may compare the bits in window 700 to start bit reference pattern 762 (e.g., "01-01-00," which is also equivalent to "110" in full-bit representation and where the "00" half-bits represent the detected start bit). After detecting the start bit, phase adjustment 430 block may then perform the necessary phase alignments operations (e.g., to align the edges of the start bit boundaries to edges of the local hypothesized waveform).

In particular, the start bit detection may be performed based on a maximum likelihood sequence detection scheme such as an Asymptotic/Approximate Maximum Likelihood Sequence Detection (AMLSD) scheme. The maximum likelihood sequence detection scheme may be used to perform start bit detection by identifying the window that yields the minimum sum of absolute difference between the incoming data bits in the window and the start bit reference pattern (as an example). In other words, the AMLSD only relies on the current bit for decision making while leverage the preceding bits in the window for phase alignment purposes. The maximum likelihood determination may be expressed as finding the index i that yields the minimum sum in equation 1 below:

$$\Sigma_i |x_i(n) - y_i(n)| \qquad (1)$$

where $x_i(n)$ represents the input bits and where $y_i(n)$ represents the expected reference pattern. The expect reference pattern is sometimes referred to as the "hypothesized" pattern or hypothesized waveform. The maximum likelihood sequence determination relies on a statistical likelihood to decode, so it is not sensitive to any abrupt spiking behavior as long as the spikes do not change the statistical nature of the signal. Immunity to signal spikes enables receiver 102 to handle ASK demodulation even in high noise scenarios. Detecting the start bit in this way is merely illustrative. As examples, the AMLSD scheme may also involve finding the index i that yields the minimum sum in equation 2 or equation 3 below:

$$\Sigma_i |x_i(t) - y_i(t)|^2 \quad (2)$$

$$\Sigma_i |x_i(t) * y_i(t)| \quad (3)$$

Equations 1-3 are merely illustrative. Other statistical or sequence matching methods for detecting similarities between two data streams can also be used.

Figure 8A:
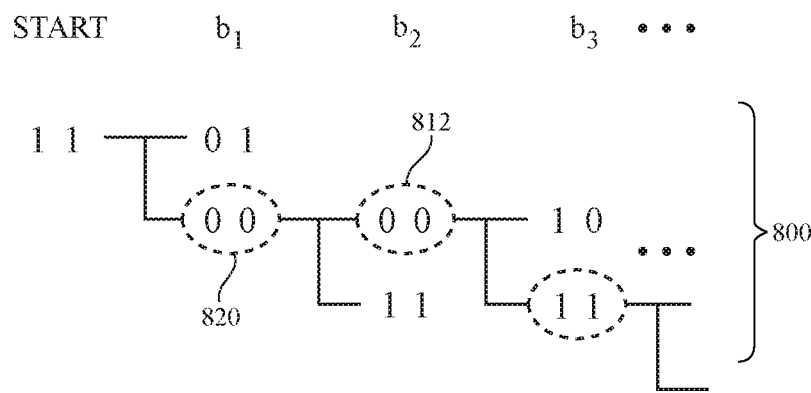
FIGS. 8A and 8B are diagrams showing how data bit reference patterns can be dynamically generated as successive data bits are detected in accordance with an embodiment.
Figure 8B:
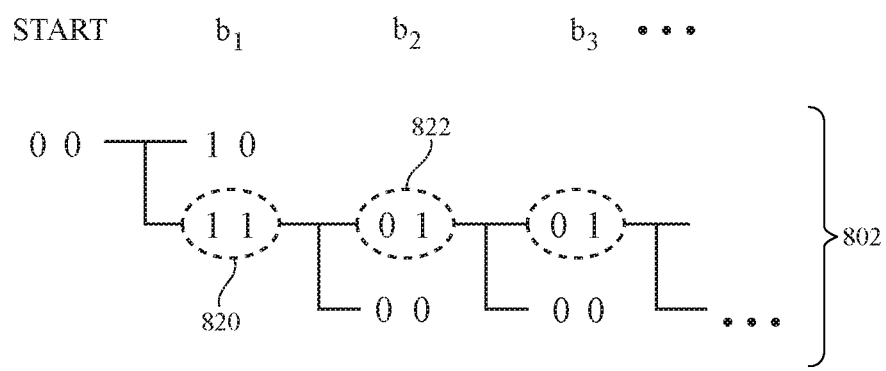

After start bit detection 426, the data bit detection component 432 may be configured to detect subsequent data bits by comparing each incoming data bit to a reference data bit pattern that is dynamically constructed using component 434 based on the previous bit (as indicated by feedback path 436). FIGS. 8A and 8B are diagrams of decision trees showing how data bit reference patterns can be dynamically generated as successive data bits are detected in accordance with an embodiment.

If the start bit is equal to "11" such as in start bit reference pattern 760 with an initial phase of 0 degrees, then the next possible data bit can either be "01" (representing a full-bit value of one) or "00" (representing a full-bit value of zero). In this case, component 434 may dynamically generate a first reference pattern "10-11-01" and a second reference pattern "10-11-00." Data bit detection 432 may also be performed based on a maximum likelihood sequence detection scheme, which performs data bit detection by identifying the window that yields the minimum sum of absolute difference between the incoming data bits in the window and the dynamically generated reference patterns (as an example).

Assuming the incoming data matches with the second reference pattern (i.e., "10-11-00") as indicated by data bit detection 810, then a logic "0" data bit is currently detected. At this point, the next possible data bit can either be "10" (representing a full-bit value of one) or "11" (representing a full-bit value of zero). Now, component 434 may dynamically generate a third reference pattern "11-00-10" and a fourth reference pattern "11-00-11" based on the second reference pattern. Assuming the new incoming data matches with the third reference pattern (i.e., "11-00-10") as indicated by data bit detection 812, then a logic "1" data bit is currently detected. This iterative process can continue to resolve successive data bits in the message byte according to decision tree 800, which will continue to branch off with each successive data bit.

If the start bit is equal to "00" such as in start bit reference pattern 762 with an initial phase of 180 degrees, then the next possible data bit can either be "10" (representing a full-bit value of one) or "11" (representing a full-bit value of zero). In this case, component 434 may dynamically generate a fifth reference pattern "01-00-10" and a sixth reference pattern "01-00-11." Data bit detection 432 may again use a maximum likelihood sequence detection scheme to match the incoming data bits with the dynamically generated reference patterns.

Assuming the incoming data matches with the sixth reference pattern (i.e., "01-00-11") as indicated by data bit detection 820, then a logic "1" data bit is currently detected. At this point, the next possible data bit can either be "01" (representing a full-bit value of one) or "00" (representing a full-bit value of zero). Now, component 434 may dynamically generate a seventh reference pattern "00-11-01" and an eighth reference pattern "00-11-00" following on from the sixth reference pattern. Assuming the new incoming data matches with the seventh reference pattern (i.e., "00-11-01") as indicated by data bit detection 822, then a logic "1" data bit is currently detected. The process can continue to resolve successive data bits in the message byte according to decision tree 802, which will continue to expand with each data bit detection. After detecting the last data bit (i.e., the eighth data bit in a message byte), phase adjustment block 438 block may then perform the necessary phase alignments operations (e.g., to align the edges of the data bit boundaries to edges of the local reference waveform). This is merely illustrative. If desired, phase adjustment 438 may be performed with the detection of each successive data bit.

Start bit detection 426 and data bit detection 432 can be repeated for each successive message byte in the data packet. After all the data bytes in the message has been detected, block 440 may be configured to perform protocol checking. Protocol check 440 may check for the validity of the start bit, the stop bit, and also the parity bit (e.g., to determine whether the demodulated parity bit is correct given the received data bits). If protocol check 440 succeeds, the data bytes are then forwarded to block 442 to perform a checksum comparison operation to ensure that the data received has not been corrupted during the transfer. For example, block 442 may use a predetermined polynomial key or some other hashing function to compute a checksum value and to compare the computed checksum value to a predetermined checksum appended at the end of the data packet (see, e.g., FIG. 5). If the computed checksum value and the received checksum do not match, then the received data is possibly corrupt. If the computed checksum value and the received checksum are identical, then the received data is not corrupted. The final demodulated data packet is provided at output 454.

If protocol check 440 is unsatisfactory, an error signal may be asserted on control path 450, which alerts ASK ending detection block 448 that an error has occurred. ASK ending detection block 448 normally asserts a data valid flag to checksum block 442 on control path 452. An asserted data valid flag may indicate that ASK demodulation is currently active. When protocol check 440 asserts the error signal, this may cause ASK ending detection block 448 to deassert the data valid flag, which indicates that ASK demodulation is no longer active. Another scenario that might cause ASK ending detection block 448 to deassert the data valid flag is when the amplitude of the incoming data bits change dramatically. The monitoring of such amplitude changes can be performed using blocks 444 and 446. Block 444 may first detect and remove any stray outliers. After removing the outliers, block 446 may detect the absolute signal strength of the incoming signal. An abrupt change in the signal strength (e.g., if the signal strength suddenly jumps by a factor of at least 1.5, at least 1.8, at least 2, at least 4, etc.) is also indicative that ASK demodulation has ended, which should then trigger component 448 to deassert the data valid flag.

The example above in which preamble detection, start bit detection, and data bit detection is performed using a window size of 3 bits is merely illustrative. If desired, a sliding window of any suitable bit width can be used (e.g., by analyzing the two most recently received bits, the four most recently received bits, five or more most recently received bits, etc.). The example of FIG. 4B in which receiver 102 performs preamble detection, start bit detection, and data bit detection is also merely illustrative. If desired, data receiver 102 may be configured to also perform stop bit detection, parity bit detection, and/or detection of other control bits that might be included in a data packet according to the Qi wireless charging standard. The techniques described herein need not be limited to the demodulating Qi-compliant data packets. Data receiver 102 may be configured to support demodulation and detect protocol-related information for any suitable wireless charging protocol that supports data rate of 2 kbps or more. Detecting protocol information using maximum likelihood sequence detection provides high noise tolerance, which will enable receiver 102 to achieve improved communication speeds of up to 16 kbps or higher.

Figure 9:
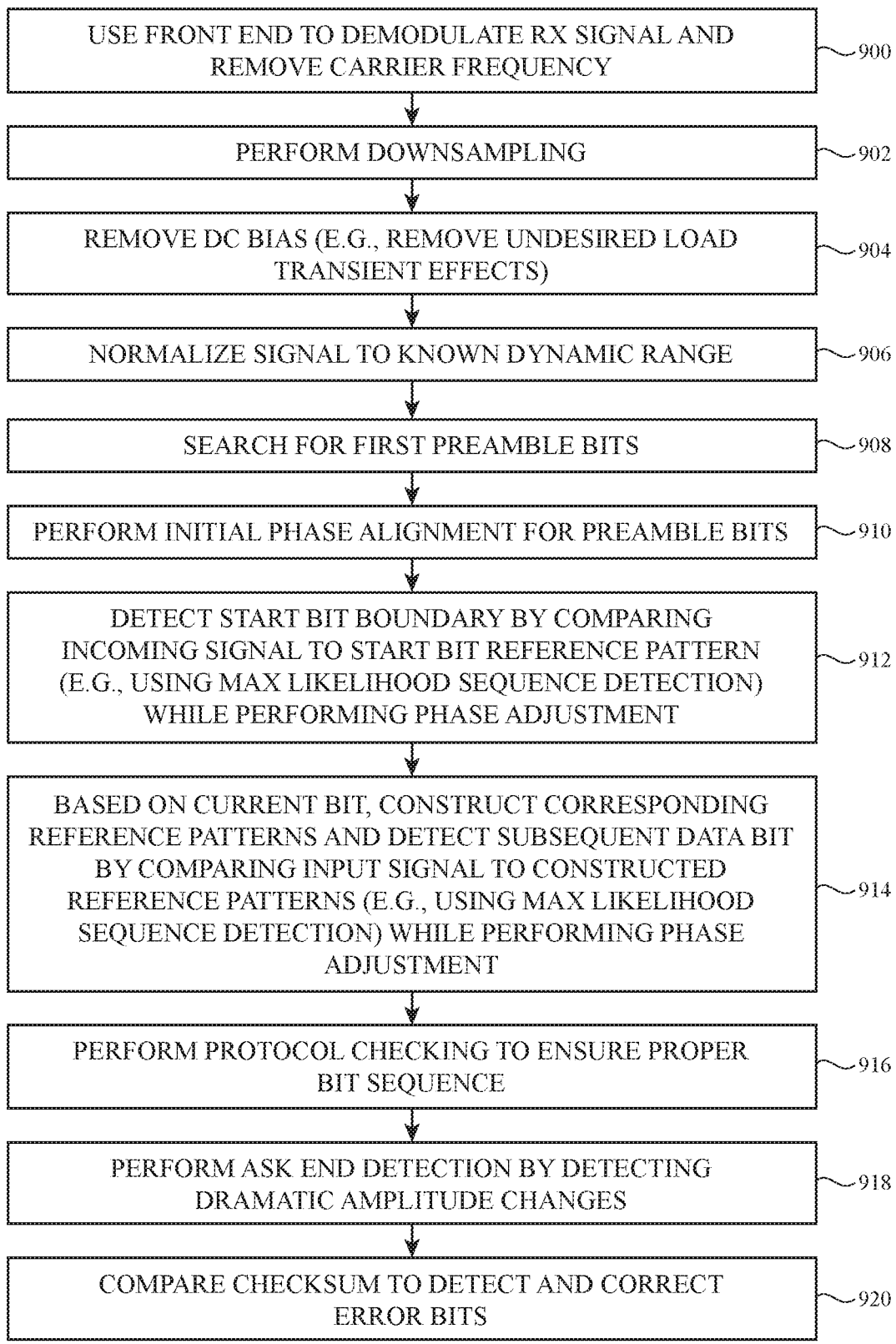
FIG. 9 is a flow chart of illustrative steps for leveraging protocol information during demodulation operations to recover a half-bit data stream in accordance with an embodiment.

FIG. 9 is a flow chart of illustrative steps for operating data receiver 102 to recover a half-bit data stream in accordance with an embodiment. At step 900, receiver 102 may use front end 402 to remove the carrier frequency component from the received ASK signal. At step 902, receiver 102 may down-sample the signals received from the front end portion (block 408 in FIG. 4A). At step 904, receiver 102 may remove any unwanted DC bias, such as to removed undesired load transient effects (block 410 in FIG. 4A). At step 906, receiver 102 may normalize the signal to a known dynamic range (block 416 in FIG. 4A) and optionally perform low-pass filtering (block 418).

At step 908, receiver 102 may search for preamble bits (e.g., by using a sliding window to detect a series of logic ones). This step may be similar to block 422 in FIG. 4B. After the preamble bits have been detected, at step 910, receiver 102 may perform phase alignment on the preamble bits (block 424 in FIG. 4B).

At step 912, receiver 102 may search for the start bit by comparing the incoming signal to one or more start bit reference patterns (e.g., using an asymptotic or approximate maximum likelihood sequence detection scheme). This step may be similar to block 426 in FIG. 4B. After the start bit has been detected, receiver 102 may perform phase adjustment on the start bit (block 430).

At step 914, receiver 102 may search for data bits. In particular, receiver 102 may dynamically construct corresponding data bit reference patterns based on the previous bit in real time and then detect the subsequent data bit by comparing the input signal to the dynamically constructed data bit reference patterns (e.g., using an approximate maximum likelihood sequence detection scheme). This step may be similar to block 432 in FIG. 4B. In response to detecting each successive data bit, receiver 102 may perform phase adjustment on the current data bit (block 438). All data bits in a packet may be identified in this way.

At step 916, receiver 102 may perform a protocol check to ensure that the proper bit sequence has been detected. This step may be similar to block 440 in FIG. 4B. At step 918, receiver 102 may optionally perform ASK end detection by detecting dramatic signal amplitude changes. This step may be similar to block 448 in FIG. 4B. If a sudden amplitude change occurs, receiver 102 may temporarily halt all receive operations. At step 920, receiver 102 may compare the checksum to detect and optionally correct any error bits. This step may be similar to block 442 in FIG. 4B.

The example of FIG. 4B in which data receiver 102 resolves incoming data one bit at a time might be prone to errors since there is no way to retroactively recover from a situation in which one of the data bits was incorrectly detected. For example, the decision tree 800 will be entirely wrong if data bit b1 was erroneously matched to "01". As another example, decision tree 802 will be partially erroneous if data bit b3 was inadvertently matched to "00". In other words, a single wrong decision will ripple through the entire decision tree.

Figure 10:
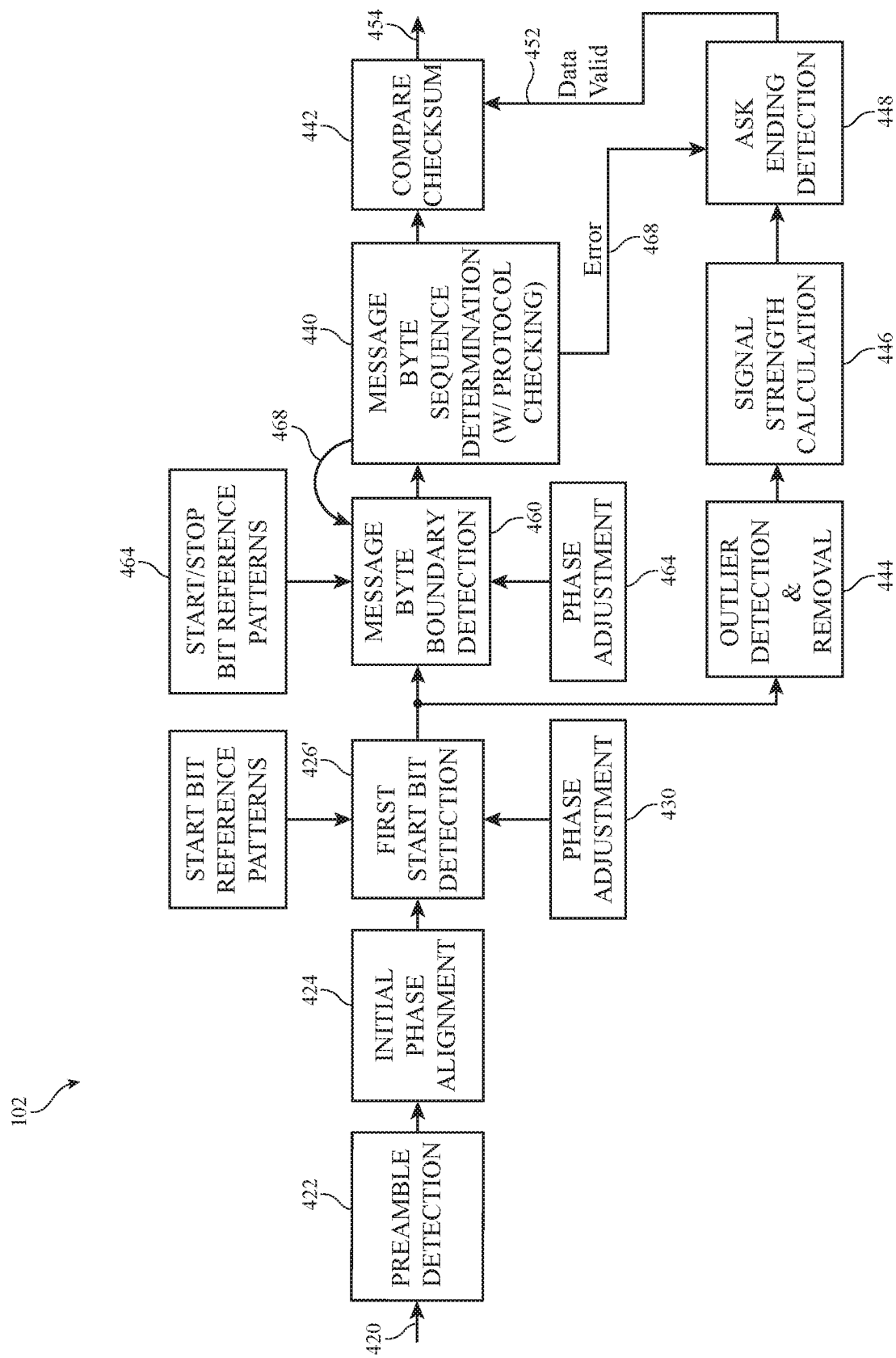
FIG. 10 is a diagram of a second portion of an illustrative data receiver configured to perform message byte boundary detection in accordance with an embodiment.

In accordance with another embodiment, FIG. 10 shows another configuration of data receiver 102 that is capable of accurately determining an entire data bit sequence within a packet without the risk of having one wrong data bit decision affecting the integrity of the whole byte. Similar to FIG. 4B, FIG. 10 is a circuit diagram of a second portion of data receiver 102, which receives signals directly from low-pass filter component 418 via output path 420 (continuing from FIG. 4A). As shown in FIG. 10, data receiver 102 may further include a preamble detection block 422, an initial phase alignment block 424, a first start bit detection block 426' and associated phase adjustment block 430, packet byte boundary detection block 460 and associated phase adjustment block 464, a packet byte sequence determination block 466, a checksum comparison block 442, and other control circuitry such as outlier detection and removal block 444, signal strength calculation block 446, and ASK ending detection block 448. The structure and function of blocks 422, 424, 442, 444, 446, and 448 are substantially similar to that already described in connection with FIG. 4B and need not be repeated in detail to avoid obscuring the present embodiments.

At least blocks 422, 426', 460, and 466 may be configured to detect protocol information in the received signals during the demodulation process (i.e., these blocks may be considered as part of demodulation circuitry within receiver 102). Depending on the wireless power transfer protocol that is implemented, the received signals may be ASK data packets with a particular packet structure/format. Here, a data packet format in accordance with the Qi wireless power transfer protocol (see, e.g., FIG. 5) will be used as an example. This is, however, merely illustrative. In general, data receiver 102 may be configured to demodulate and decode data packets in accordance with any format or wireless communications standard.

As already described above, preamble detection block 422 may receive data packet signals via path 420 and may be configured to identify preamble bits. Preamble detection 422 may search for a series of logic ones using a sliding window with any bit width (see, e.g., window 700 in FIG. 7A). Preamble detection 422 succeeds only when all the bits within the sliding window are logic ones. After successfully detecting the preamble bits, the edges of the data bit boundaries can be accurately aligned to edges of a local reference pattern. Preamble detection 422 may terminate after the first edge alignment operation. Moreover, initial phase alignment block 424 may be configured to determine whether the initial phase or the polarity of the detected preamble bits and to perform the necessary phase alignment operations.

After initial phase alignment 424, detection component 426' may search for the first start bit following the preamble bits. As an example, the first start bit in a data packet may be the first logic "0" that follows the high preamble bits. In other words, first start bit detection 426' succeeds only when the bits within the sliding window 700 are "11 . . . 10" (with the "0" being the first start bit). Depending on the polarity of the incoming bits (i.e., whether the initial phase is equal to 0 degrees or 180 degrees), the first start bit may be compared to a first start bit reference waveform (e.g., reference pattern 760 of FIG. 7C) or a second start bit reference waveform (e.g., reference pattern 762 of FIG. 7C). Identification of the first logic "0" following preamble detection is indicative of a successful start bit detection. After detecting the start bit, phase adjustment block 430 may then perform the necessary phase alignments operations (e.g., to align the edges of the start bit boundaries to edges of the local hypothesized start bit waveform).

In general, first start bit detection 426' may be based on a maximum likelihood sequence detection scheme such as the Asymptotic/Approximate Maximum Likelihood Sequence Detection (AMLSD) scheme (e.g., by performing computations similar to those shown in equations 1-3 above), or other suitable statistical or sequence matching methods for detecting similarities between two different data streams.

After first start bit detection 426', message byte boundary detection component 460 may be configured to detect the boundaries of each message byte (sometimes also referred to as a packet byte). Each message byte is bounded on one end by a start bit and on the other end by a stop bit (see, e.g., FIG. 5). The expected value of the start and stop bits are generally known. For example, in accordance with the Qi wireless power transfer protocol, the start bit is equal to a logic "0" while the stop bit is equal to a logic "1". Furthermore, the number of data bits in between the start and stop bits are also known. In the Qi data packet example, there will be nine bits of data (which include the one byte of message data bits and the associated parity bit) between each successive pair of start and stop bits.

Thus, message byte boundary detection component 460 will gather a sufficient number of data samples so that it is able to analyze all the incoming bits in an entire message byte (inclusive of the start and stop bits). This process in which the bit decision making relies on all bits in one data packet at the byte level instead of the bit level is sometimes referred to as a maximum likelihood sequence estimate (MLSE) algorithm. Depending on the polarity of the incoming bits, sampled start and stop bits may be compared to start and stop bit reference patterns 462, respectively. As described above, the hypothesized start bit waveform (i.e., whether it is a logic "1" or "0") and the hypothesized stop bit waveform (i.e., whether it is a logic "1" or "0") may be dictated and predetermined by whatever data packet format is currently in use. After detecting the boundary or edges of an incoming message byte, phase adjustment block 464 may then perform the necessary phase alignments operations (e.g., to align the edges of the start and stop bit boundaries to edges of the local hypothesized start/stop bit waveforms).

Similar to first start bit detection 426', message byte boundary detection 460 may be based on a maximum likelihood sequence detection scheme such as the Asymptotic Maximum Likelihood Sequence Detection (AMLSD) scheme (e.g., by performing computations similar to those shown in equations 1-3 above), other maximum likelihood sequence estimation (MLSE) methods, or other suitable statistical or sequence matching methods for detecting similarities between two different data streams.

Figure 11:
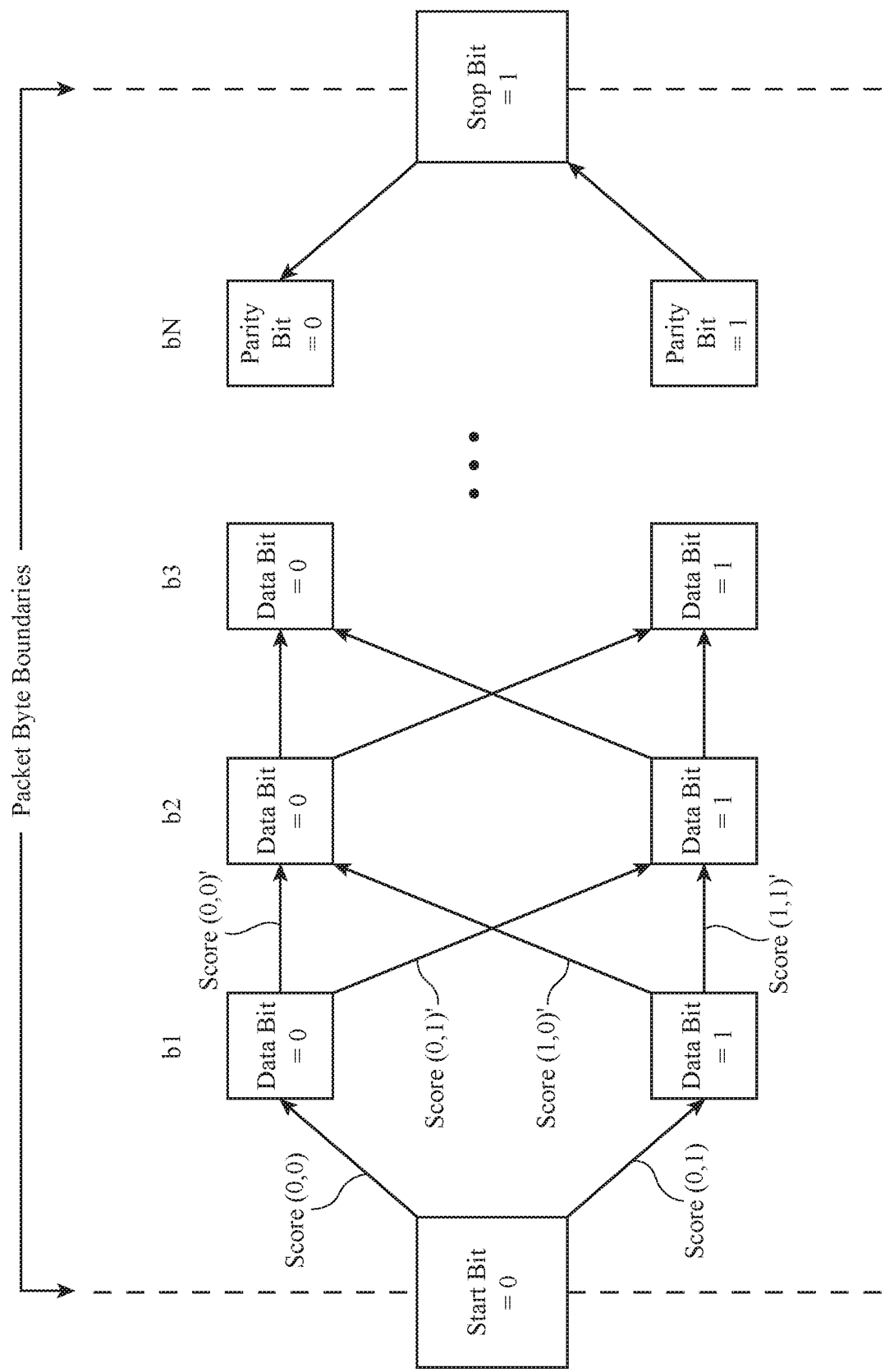
FIG. 11 is a diagram illustrating an edge-constrained estimation method that involves computing scores for all possible data bit sequences bounded by start and stop bits in accordance with an embodiment.

After message byte boundary detection 460, message byte sequence determination component 466 may be used to identify the correct sequence of data bits that is bounded by the start and stop bits. FIG. 11 is a diagram illustrating an edge-constrained estimation method that involves computing scores for all possible data bit sequences bounded by the start and stop bits. After setting the message byte boundaries (as indicated by the dotted edges in FIG. 11), we know that there is only a limited number of possible data bit sequences that can transpire. In an example where there are nine bits of data (including the parity bit) in between the start and stop bits, there can be $2^9$ or 512 possible permutations of data bit sequences. In another example in which there are 10 bits of data in between packet/message byte boundaries, there may be $2^{10}$ or 1024 possible permutations of data bit sequences. In yet another example in which there are 14 bits of data interposed between detected package byte boundaries, there can be $2^{14}$ or 16384 possible permutations of data bit streams. In general, block 466 may be configured to analyze message bytes with two to ten, 10-20, more than 20, or any suitable number of data bits within predetermined message byte edges.

As shown in FIG. 11, each possible data bit transition may be assigned a corresponding score using a maximum likelihood sequence detection scheme such as the Asymptotic Maximum Likelihood Sequence Detection (AMLSD) scheme (e.g., by performing computations similar to those shown in equations 1-3 above), other maximum likelihood sequence estimation (MLSE) methods, or other suitable statistical or sequence matching methods for detecting similarities between two different data patterns. A higher score may be reflective of better matching (i.e., that the waveforms being compared are similar), whereas a lower score may be indicative of poorer matching (i.e., that the waveforms being compared are dissimilar). For example, the first incoming data bit b1 following the "0" start bit may be compared with a reference/hypothesized waveform of logic "0" and is assigned a score of Score(0,0). In parallel with the computation of Score(0,0), incoming data bit b1 may be compared with a reference/hypothesized waveform of logic "1" and is assigned a score of Score(0,1).

Stemming from data bit b1=0, the second incoming data bit b2 may be compared with a reference waveform of logic "0" and is assigned a score of Score(0,0)'. In parallel with the computation of Score(0,0)', incoming data bit b2 may be compared with a reference waveform of logic "1" and is assigned a score of Score(0,1)'. Meanwhile, stemming from data bit b1=1, the second incoming data bit b2 may be compared with a reference waveform of logic "0" and is assigned a score of Score(1,0)'. In parallel with the computation of Score(1,0)', incoming data bit b2 may be compared with a reference waveform of logic "1" and is assigned a score of Score(1,1)'. Additional scores for each possible data bit may be successively computed for bits b3 all the way up to parity bit bN. Once the scores for all possible data bits have been computed, a combined score for each possible path from the start bit to the stop bit may be calculated. In the example where there are 512 possible data bit sequences between the message byte boundaries, 512 cumulative path scores can be computed. The data bit sequence corresponding to the highest cumulative path score will be selected as the correct decoded bitstream.

Decoding the incoming data bits in this way may be advantageous since it does not rely on the correct decision of each successive data bit as is the case with the embodiment of FIG. 4B. Moreover, the step of first identifying the message byte boundaries can help limit and constrain the search space of the possible data bit sequences (e.g., the existence of the package byte boundaries can be leveraged to help reduce the computational complexity to smaller, more manageable chunks). If desired, the calculation of the different path scores can optionally be pruned by truncating one or more paths when one path score is substantially higher than another. For example, the cumulative path scores might be calculated as each successive score is being generated. When the cumulative score of a first path is at least 20%, at least 30%, at least 40%, 50-100% or more than double that of a second path, then the second path can be immediately truncated and discarded to save computational power.

Once the data bit sequence with the highest cumulative path score has been selected, block 466 may also perform protocol checking. For example, the selected data bit sequence will either have a parity bit that is equal to "0" or "1". Block 466 may analyze the rest of the data bits in the decoded data bit sequence and compute a corresponding parity bit. The computed parity bit may then be compared with the received parity bit to verify the integrity of the message byte. This process can continue to resolve successive message bytes in the data packet until the last message byte has been detected.

After all message bytes in the data package have been decoded, the data bytes are then forwarded to block 442 to perform a checksum operation to ensure that the data received has not been corrupted during the transfer. For example, block 442 may use a predetermined polynomial key to compute a checksum value and to compare the computed checksum value to a predetermined checksum appended at the end of the data packet. If the computed checksum value and the received checksum do not match, then the received data is possibly corrupt. If the computed checksum value and the received checksum are identical, then the received data is not corrupted. The final demodulated data packet is provided at output 454.

If the protocol checking at block 466 is unsatisfactory, an error signal may be asserted on control path 468, which alerts ASK ending detection block 448 that an error has occurred. ASK ending detection block 448 normally asserts a data valid flag to checksum comparison block 442 on control path 452. An asserted data valid flag may indicate that ASK demodulation is currently active. When protocol check 466 asserts the error signal, this may cause ASK ending detection block 448 to deassert the data valid flag, which indicates that ASK demodulation is no longer active.

The example of FIGS. 10 and 11 in which receiver 102 performs preamble detection, first start bit detection, message byte boundary detection, and message byte sequence determination is merely illustrative. If desired, data receiver 102 may be configured to also perform stop bit detection, parity bit detection, and/or detection of other control bits that might be included in a data packet according to the Qi wireless charging standard. The techniques described herein need not be limited to the demodulating Qi-compliant data packets. Data receiver 102 may be configured to support demodulation and detect protocol-related information for any suitable wireless charging protocol that supports data rate of 2 kbps or more. Detecting protocol information using maximum likelihood sequence detection provides high noise tolerance, which will enable receiver 102 to achieve improved communication speeds of up to 16 kbps or higher.

Figure 12:
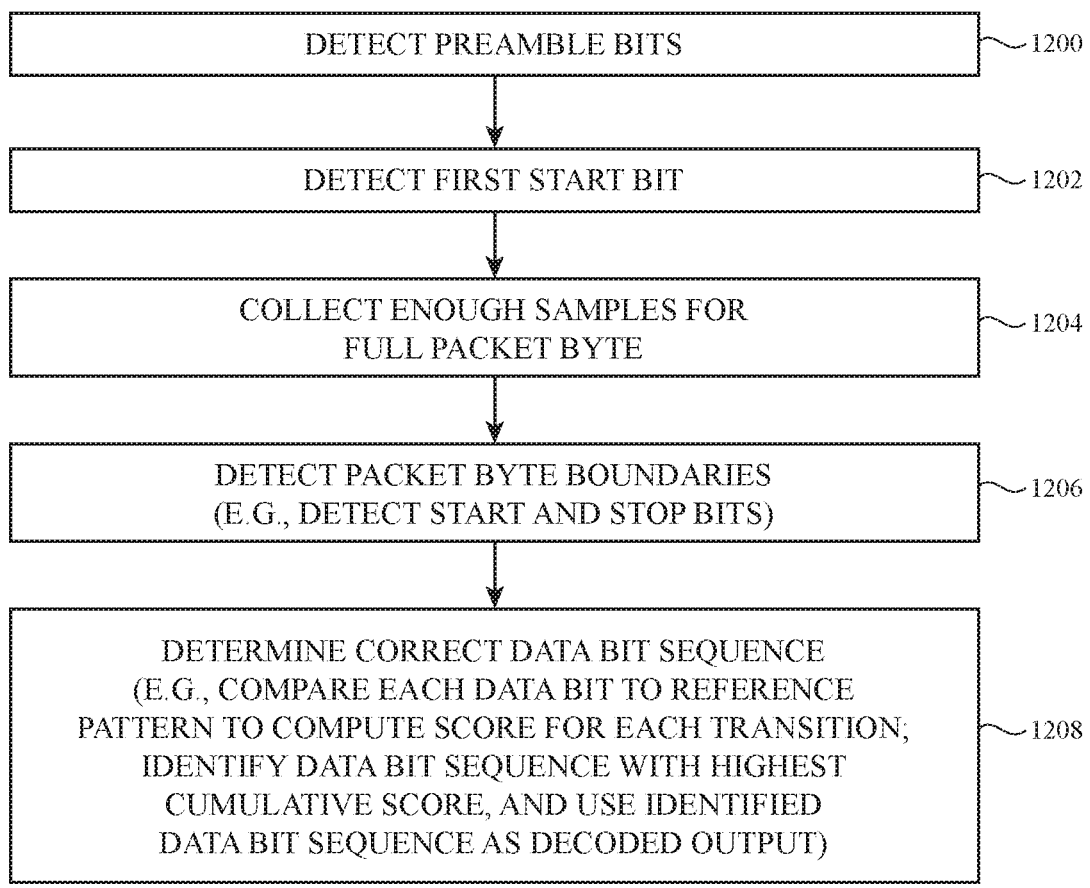
FIG. 12 is a flow chart of illustrative steps for operating the receiver circuitry shown in FIG. 10 in accordance with an embodiment.

FIG. 12 is a flow chart of illustrative steps for operating receiver circuitry 102 of the type described in connection with FIGS. 10 and 11.

At step 1200, block 422 may be configured to perform preamble bits. In particular, the incoming bits may be compared to and aligned with a preamble bit reference pattern (e.g., a series of all ones). At step 1202, block 426' may be configured to detect the first start bit. In particular, the data receiver may look for the first logic "0" following the preamble bits (as an example).

At step 1204, the data receiver may collect adequate samples for a full message byte. For example, if the data receiver oversamples the incoming waveform with 750 samples per data bit, then message byte boundary detection 460 will need to examine at least 750*M samples, where M is the total number of bits in a message byte including the start and stop bits. In the example of a Qi data packet, M is equal to 11 (see, e.g., data packet 500 of FIG. 5).

At step 1206, block 460 may then detect the message byte boundaries (e.g., to detect the start and stop bits in each message byte). By pegging the boundaries of each message/ package byte, the search space for all possible data bit sequences in that message byte is constrained within a deterministic set of possibilities.

At step 1208, block 466 may be used to determine the correct data bit sequence (e.g., by comparing each data bit to hypothesized reference patterns to compare scores for each data bit transition and to identify data bit sequences with the highest cumulative score). The data bit sequence corresponding to the heist cumulative path score may be selected as the decoded data stream provided on output terminal 454 (FIG. 10).

Encoding the BMC encoding knowledge into the demodulation process in this way while using the maximum likelihood sequence detection method to match the incoming signals to expected reference patterns enables data receiver 102 to better evaluate the ASK signal waveform and drive the correct bit value. In practice, this translates to improved noise rejection and therefore increase the robustness of the communication between device 10 and device 12 (FIG. 1). In contrast to other demodulation techniques which analyzes signal components at one or more harmonic frequencies in addition to the carrier frequency, the embodiments described herein do not consider/monitor any harmonic components and thus greatly simplifies computational load during demodulation. Moreover, the phase recovery components (e.g., phase alignment 424 and phase adjustments 430 and 438/464 in FIG. 4B and FIG. 10) provides receiver 102 with immunity to phase change, both for the data symbols and carrier wave.

The foregoing describes a technology that enables data transmission in the context of wireless power transfer. The present disclosure contemplates that it may be desirable for a power transmitter and a power receiver device to communicate information such as states of charge, charging speeds, so forth, to control power transfer. The present disclosure recognizes the foregoing technology, which relates to the general topic of data transfer, may be leveraged to transfer other kinds of data, such as data that are more personal in nature.

It is noted that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

To the extent that the present technology is leveraged to transmit personal information data, hardware and/or software elements can be provided for users to selectively block the use of, or access to, personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

It is the intent of the present disclosure to describe a robust system for data transmission in a wireless power system. In implementations of this technology were personal information data is transmitted, that personal information data should be managed and handled in a way to minimize risks of unintentional or unauthorized access or use. Risk can be minimized by limiting the collection of data and deleting data once it is no longer needed. In addition, and when applicable, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

The foregoing is merely illustrative and various modifications can be made to the described embodiments. The foregoing embodiments may be implemented individually or in any combination.

What is claimed is:

1. A wireless power transmitting device operable with a wireless power receiving device that has a wireless power receiving coil modulated to transmit data to the wireless power transmitting device, the wireless power transmitting device comprising:
   a wireless power transmitting coil;
   wireless power transmitting circuitry coupled to the wireless power transmitting coil and configured to transmit wireless power signals with the wireless power transmitting coil, wherein the wireless power transmitting circuitry is configured to modulate the transmitted wireless power signals at a carrier frequency; and
   a data receiver coupled to the wireless power transmitting coil, wherein the data receiver is configured to:
      receive the data transmitted from the wireless power receiving device;
      detect preamble bits in the received data; and
      detect a start bit in the received data by computing a difference between the received data and a start bit reference pattern.

2. The wireless power transmitting device of claim 1, wherein the start bit immediately follows the preamble bits in the received data.

3. The wireless power transmitting device of claim 1, wherein the data receiver is further configured to detect the preamble bits using a sliding window to identify a series of logic ones in the received data.

4. The wireless power transmitting device of claim 1, wherein the data receiver is further configured to perform an initial phase alignment on the detected preamble bits.

5. The wireless power transmitting device of claim 1, wherein the data receiver is further configured to detect the start bit using a sliding window to detect a first logic zero following the preamble bits in the received data.

6. The wireless power transmitting device of claim 1, wherein the data receiver is further configured to adjust the phase of the received data based on the detected start bit.

7. The wireless power transmitting device of claim 1, wherein the data receiver is further configured to detect data bits in the received data.

8. The wireless power transmitting device of claim 7, wherein the data receiver is further configured to detect the data bits by computing a difference between the received data and a data bit reference pattern that is dynamically generated based on the detected start bit or based on a previously detected data bit.

9. The wireless power transmitting device of claim 7, wherein the data receiver is further configured to adjust the phase of the received data based on the detected data bits.

10. The wireless power transmitting device of claim 7, wherein the data receiver is further configured to perform protocol checking operations after detecting the data bits.

11. A wireless power transmitting device operable with a wireless power receiving device that has a wireless power receiving coil modulated to transmit data to the wireless power transmitting device, the wireless power transmitting device comprising:
   a wireless power transmitting coil;
   wireless power transmitting circuitry coupled to the wireless power transmitting coil and configured to transmit wireless power signals with the wireless power transmitting coil, wherein the wireless power transmitting circuitry is configured to modulate the transmitted wireless power signals at a carrier frequency; and
   a data receiver coupled to the wireless power transmitting coil, wherein the data receiver is configured to:
      receive the data transmitted from the wireless power receiving device, wherein the received data comprises a data packet having preamble bits followed by at least one message byte;
      detect boundaries of the at least one message byte;
      compute scores for different data bit sequences for the at least one message byte after detecting the boundaries;
      select a data bit sequence with a highest cumulative score from among the different data bit sequences, and
      perform a checksum operation after selecting the data bit sequence with the highest cumulative score.

12. A wireless power transmitting device operable with a wireless power receiving device that has a wireless power receiving coil modulated to transmit data to the wireless power transmitting device, the wireless power transmitting device comprising:
   a wireless power transmitting coil;
   wireless power transmitting circuitry coupled to the wireless power transmitting coil and configured to transmit wireless power signals with the wireless power transmitting coil, wherein the wireless power transmitting circuitry is configured to modulate the transmitted wireless power signals at a carrier frequency; and
   a data receiver coupled to the wireless power transmitting circuitry to receive the transmitted data from the wireless power transmitting coil, the data receiver comprising:

a demodulator front end block configured to remove the impact of the carrier frequency from the received data;

a direct current (DC) remover block configured to remove a DC bias from the received data; and a data bit detection block configured to detect data bits in the received data by comparing the received data to dynamically generated data bit reference patterns.

13. The wireless power transmitting device of claim 12, wherein the data receiver further comprises:

a down-sampling block interposed between the demodulator front end block and the DC remover block;

a signal range normalizer block interposed between the DC remover block and the plurality of detection blocks, wherein the signal range normalizer block is configured to scale the received data to a known dynamic range; and a low-pass filtering block interposed between the signal range normalizer block and the plurality of detection blocks.

14. The wireless power transmitting device of claim 12, wherein the data receiver further comprises:

a preamble detection block configured to detect the preamble bits in the received data; and a start bit detection block configured to detect the start bits in the received data by comparing the received data to at least one start bit reference pattern.

15. The wireless power transmitting device of claim 14, wherein the data receiver further comprises:

an initial phase alignment block configured to perform phase alignment after detecting the preamble bits;

a first phase adjustment block configured to perform first phase adjustments when detecting the start bits; and a second phase adjustment block configured to perform second phase adjustments when detecting the data bits.

* * * * *